Sept. 8, 1970     S. J. MARKOWSKI     3,527,408
CURVED EXHAUST DEFLECTION SYSTEM
Filed June 6, 1968
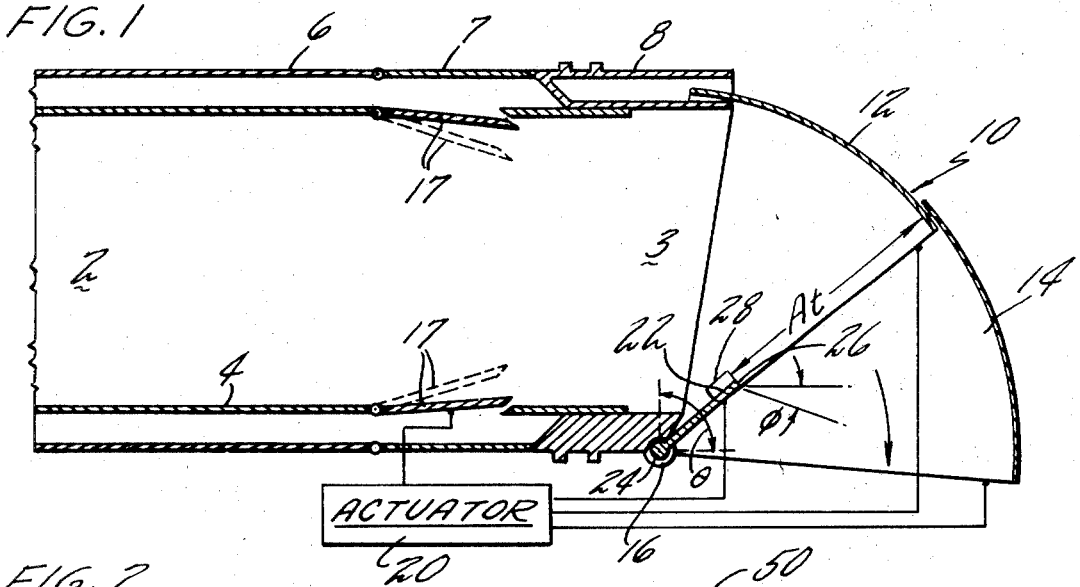
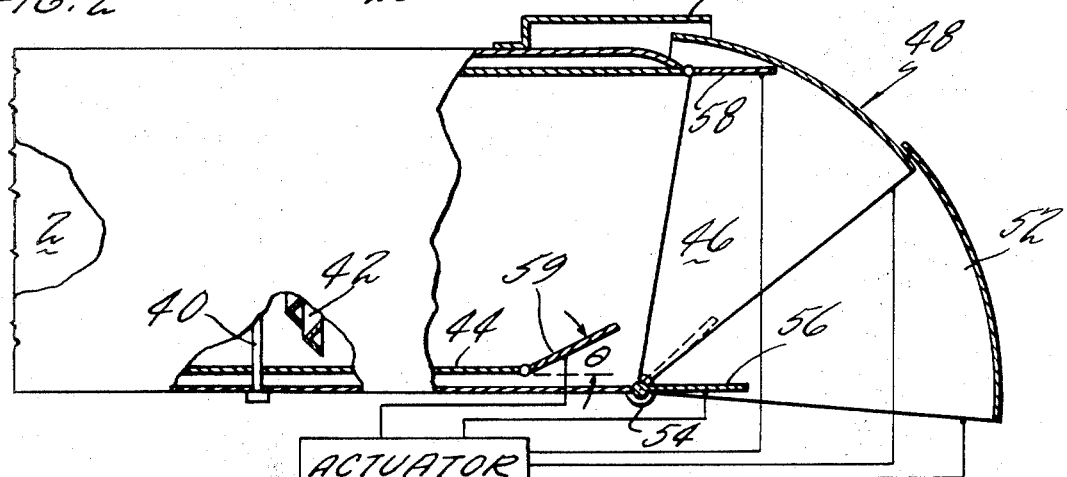
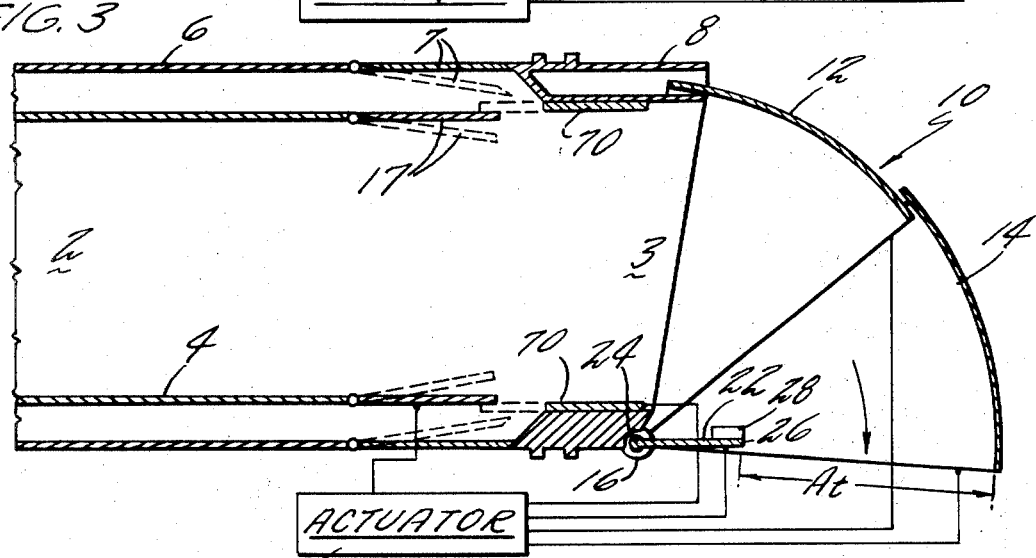
INVENTOR
STANLEY J. MARKOWSKI

3,527,408
CURVED EXHAUST DEFLECTION SYSTEM
Stanley J. Markowski, East Hartford, Conn., assignor to United Aircraft Corporation, East Hartford, Conn., a corporation of Delaware
Filed June 6, 1968, Ser. No. 735,130
Int. Cl. B64c *15/04*
U.S. Cl. 239—265.27    10 Claims

ABSTRACT OF THE DISCLOSURE

A deflection system for an aircraft gas engine wherein a plurality of pivotally mounted deflector segments cooperate to define a vertically directed flow path for jet engine exhaust gases and wherein a movable body cooperates with one or more of the deflector segments to define a discharge area for the deflected gases. Additionally, a translatable liner is positioned at the deflector inlet to prohibit flow separation in the deflection system.

This application is reported as a subject invention under Government contract AF33(657)15786.

BACKGROUND OF THE INVENTION

This invention relates to an exhaust deflection system for a gas stream, and, more particularly, it relates to a variable area exhaust configuration for deflected gas stream, especially a deflected gas stream to be used for vertical take-off and landing with a gas turbine engine powered aircraft.

With the advent of vertical take-off and landing aircraft the requirement has arisen whereby the exhaust stream of an engine should be directed in a downward direction for at least a part of the flight regime. Several significant problems are encountered in deflecting the normally axial or horizontal flow from a gas turbine engine in a downward direction, these problems being magnified when it is desired to use an afterburner with the engine. Some of the problems encountered in deflecting the exhaust stream are the avoidance of engine suppression; maintenance of a high velocity coefficient for the deflected stream, that is, high efficiency for the deflected stream and minimizing the turning losses. One prior art construction which has avoided some of the foregoing problems is described in the disclosure of the Markowski Pat. No. 3,380,660. A second prior art construction which has proven to be successful in deflecting the exhaust stream from a gas turbine engine is the one described in U.S. Pat. No. 3,393,516 entitled Curved Exhaust Deflector by S. J. Markowski issued July 23, 1968.

It has been found that while deflection of the exhaust stream could be achieved with these prior art constructions, it became desirable to improve the deflection system performance and simultaneously to reduce the overall weight of the deflection system. One way of reducing the weight of the deflection system is to use a two-segment deflector; however, difficulty arises with this type construction in that full ninety degree deflection may not be obtained. The present invention solves this difficulty by providing a deflector lip arrangement which will provide full ninety degree deflection in conjunction with a two-segment hood. Additionally, it has been found that if the deflection system is employed with an afterburner that the deflection lip may be positioned upstream of the deflection apparatus effectively forming a part of the afterburner liner thereby permitting use of a shorter or elimination of any transitional section between the engine and deflector system, thereby resulting in an overall lighter deflection system.

The prior art constructions also recognized a requirement from a cooling performance standpoint and from an efficiency of performance standpoint of maintaining full flow at the entrance or inlet of the deflection system. It has been found that flow separation in the deflection system when in the VTOL or deflected mode, particularly when deflecting an afterburning exhaust, leads to high metal temperatures on the segments, these metal temperatures generally exceeding the design capability of the segments. The present invention, by eliminating flow separation at the inlet of the deflector apparatus prevents any problems caused thereby, and in fact maintains a high cooling performance and efficiency of deflection.

SUMMARY OF THE INVENTION

It is a primary object of this invention to provide a deflection system which is capable of providing ninety degree vector deflection with as little as two deflector segments; improved deflection efficiency by controlling side components of velocity in the discharge stream; improved deflection efficiency during transition from horizontal to deflected mode by preventing side leakage and a reduced effective discharge area variation during vectoring.

In the construction of the present invention, an angularly rotated deflector lip which cooperates with the deflector segments of the deflection system is provided. It has been determined that certain fundamental aspects exist between the relative position of the deflector lip and the discharge edge of the outer radius portion of the last or outer hood. More specifically, it has been discovered that the deflected exhaust stream vector is primarily determined by the lip-hood angle, herein designated $\phi$, rather than the mechanical angle $\theta$ of the segments. As a result, it was determined that the overall performance and weight characteristics of a curved exhaust deflection system could be improved. This improvement in performance was accomplished by positioning a deflector lip within the deflection system which could be rotated into and out of the exhaust stream. By moving the lip into and out of the deflected stream, or more specifically, rotating the lip upstream or downstream, an increase in exhaust stream deflection was obtained providing the capability of attaining ninety degree stream deflection with a two-segment deflection system. A secondary, but in some instances just as important result, is the sizeable weight reduction of the deflection system afforded by this two-segment capability.

A further effect obtained when the deflection lip is depressed or rotated upstream into the deflection stream is that the edges of the deflector lip together with the overlap of the outer segment side panels restrict the direction of the exhaust velocity components at the corner areas of the depressed deflector lip and as a result, the side velocity components are essentially zero. By substantially eliminating these side velocity components, a highly injurious effect on the deflected stream is avoided, and vertical thrust deflection efficiency is improved.

Additionally, by depressing the deflector lip, the discharge edge thereof will be located well inside the deflection system, and hence, the control area or discharge area of the deflection system will be fixed for a substantial rotation change of the deflector segments during the transitional mode. During this transitional mode, side leakage at the deflector lip is the single greatest mechanism which causes large deflection efficiency losses. By providing a deflector lip, with its corresponding discharge edge, which is locatable well within the deflector segments, this side leakage is substantially eleminated and hence the transition performance is substantially improved.

A second embodiment of the present invention is one wherein the deflector lip is positioned at the downstream end of the afterburner. By positioning the deflector lip downstream of the afterburner and upstream of or at the inlet of the deflection system, the transition length there-between is reduced, thus, resulting in a substantial reduction in weight. Typically, the exhaust from a gas turbine engine is through a primary exhaust nozzle, the discharge area of which is variable. By interconnecting the means for rotating the deflector lip with the means for varying the nozzle exhaust area, the change in engine suppression can be compensated for, since, as the segments are moved from the full deflection position to the stowed position, the deflector lip would be rotated to an increased mechanical angle $\theta$. This permits maintaining the engine working or operating line and is efficient from a deflection standpoint as well as not disturbing the full flow characteristics through the deflection system.

Another embodiment of the present invention is that of providing a means for maintaining full flow at the inlet of a deflection system. In many gas turbine engine configurations, a primary exhaust nozzle is used in conjunction with a plurality of blow-in-doors mounted in the engine housing. As a result, there will result a substantial gap between the end of the primary exhaust nozzle and the inlet of the deflection system. By providing a slideable or translatable member which moves axially upstream or downstream, this large gap can be closed and hence full flow in the deflection system is insured.

BRIEF DESCRIPTION OF THE DRAWINGS

FIG. 1 is a sectional elevation view of the aft end of a jet engine incorporating the present invention in the deflecting position.

FIG. 2 is a sectional elevation view of the aft end of a jet engine incorporating the present invention in the deflecting position.

FIG. 3 is a sectional elevation view of the aft end of a jet engine incorporating the present invention in the deflecting position.

DESCRIPTION OF THE PREFERRED EMBODIMENTS

Referring now to FIGS. 1, 2 and 3, the aft end of a gas turbine engine 2 is illustrated. Although the details of engine 2 are not shown, engine 2 is of a conventional design in which ambient air is drawn into a compressor and delivered in a compressed fashion to a burner section where heat is added, the air being delivered to a turbine section where work is extracted and then discharged through primary exhaust nozzle 4.

As shown in FIG. 1, ejector type exhaust nozzle 6 having blow-in-doors 7 extends deflection system 3. Reference is hereby made to U.S. Pat. No. 3,057,150 for an example of such ejector and blow-in-door structure. One section of the deflection system 3 includes engine housing 8 in which is located a plurality of deflector segments 10. Deflector segments 10 are substantially U-shaped in cross section with an arcuate end 12 and pie-shaped side segments 14 extending from a pivot 16 to the arcuate end portion 12. The plurality of segments 10 are articulated and pivot 16 is a common point for all of the segments. As illustrated, the segments 10 are in a deflected position but are stowable in housing 8. It is to be noted that any number of segments may be used to make up the deflected exhaust; however, it has been found from a weight standpoint that a two-segment deflector system is extremely desirable.

Primary exhaust nozzle 4 is of the variable area type, flaps 17 being movable inward and outward to effect the area change. During operation of the engine in normal horizontal flight the position of variable area exhaust nozzle 4 is controlled or regulated in accordance with engine parameters to provide a programmed exhaust nozzle area as a function of selected engine parameters. The control of the area of exhaust nozzle 4 is accomplished by delivering an appropriate control signal to an actuator 20 which is in turn connected to the variable area exhaust nozzle 4. The control signal for regulating the area of the exhaust nozzle 4 may be derived for example, from a control similar to that shown in U.S. Pat. No. 2,987,877.

Positioned within the deflection system 3 is deflector lip 22. Deflector lip 22 is movable about pivot 24 and cooperates with at least one of the deflector segments 14. Deflector lip 22 is substantially flat and rectangular in cross section and includes discharge edge 26. It is well known that the turning of the exhaust stream from the normally horizontal direction to the ventral direction gives rise to problems such as varying engine suppression, velocity coefficient of the exhaust stream and turning losses. By providing deflector lip 22, which cooperates within the deflector segments 14 to define the exhaust area of the deflection system these problems are overcome. Additionally, as illustrated in the embodiment of the invention in FIG. 1, it was discovered that the exhaust stream vector, as indicated by the arrow, is primarily a function of the lip-segment angle $\phi$, rather than the mechanical segment angle $\theta$. The present invention by providing a deflector lip which is rotatable around pivot 24 into and out of the exhaust stream, or more specifically in an upstream or downstream direction permits an increase in the deflection at a fixed segment mechanical angle $\theta$. It was determined that by providing a deflector lip of the construction described herein and that by depressing the deflector lip approximately twenty-six degrees into the stream or more specifically rotating the deflector lip angularly in an upstream direction, that the exhaust stream deflection was increased by approximately seven degrees. This then permitted attaining ninety degree deflection with a two-segment deflector system which substantially reduces the weight of the deflection system.

A second advantage obtained by providing a deflector lip which can be rotated angularly and depressed into the exhaust stream is that when so rotated, the deflector lip 22 together with any overlap provided by the outer segment side panels (not shown) restrict the direction of exhaust velocity components at the corner areas, i.e., the intersection of the flat deflector lip and the segment sides, of the deflector lip 26. By providing a construction of this type the side components are substantially zero. It is known that these side components adversely affect the efficiency of the vertical thrust deflection stream in that they cause the resultant deflected exhaust stream to have a fan-type distribution. Obviously, if these side components are eliminated, the deflector efficiency is improved and there are no lost increments of vertical thrust.

Additionally, by providing a deflection system with a deflector lip which can be depressed angularly into and out of the exhaust stream, the flat control or discharge edge 26 can be located well within the deflection system. Further, the control or discharge area $A_t$ is fixed for a substantial rotation of the deflector segments 22 during the transitional mode. It has also been determined that by providing side plates 28 at the extremities of deflector lip 22 the side leakage is reduced and assists in reducing the generation of adverse side components. As has been hereinbefore mentioned, this side leakage and generation of side components is a major factor in producing large deflection losses, and especially during the transition mode. By providing a construction as shown in FIG. 1 wherein the deflector lip 22 can be positioned well within the deflector segments 22, and the deflector performance is significantly improved during the transitional phase. Also, since the control or discharge area $A_t$ is located well within the deflector, it will not change until the segments rotate beyond the deflector edge 26. This reduces the magnitude of effective area change during vectoring and improves deflector performance.

Actuator 20 is the driving force or means for causing movement of both the deflector segments 10 and the deflector lip 22.

Referring now to FIG. 2, the aft end of a gas turbine engine 2, of the type described in connection with FIG. 1, is again illustrated. However, in this embodiment, the engine is an afterburning type engine and includes spray bars 40, flameholders 42 and an afterburner liner 44, positioned upstream of the inlet 46 of deflection system 48. Deflection system 48 is of the same type construction as that described in FIG. 1 and includes a housing 50, a plurality of deflector segments 52 movable about a common pivot 54. Positioned downstream of the afterburner is a primary exhaust nozzle 56 which is of the variable area type and includes a plurality of flaps 58 to provide for the change in exhaust area of nozzle 56.

In the embodiment illustrated in FIG. 2 rotatable deflector lip 59 is positioned at the downstream end of afterburner liner 44 and upstream of the inlet 46 of deflection system 48. This deflector lip 59 is substantially of the same shape and construction as deflector lip 22 of FIG. 1 and is similarly rotatable angularly upstream and downstream. As shown, the movement of the segments 52, the nozzle flaps 58 and the deflector lip 59 is caused by actuator 60; and, additionally an interconnected actuator system, for example a switching valve (not shown), is provided within actuator 60. Therefore, as the segments 52 are moved from the full deflection position towards the stowed position, the deflector lip 59 is rotated upstream to an increased angle $\theta$. This compensates for any changes in engine suppression and permits maintaining the engine working or operating line. By so doing, the deflection efficiency is not affected as well as not disturbing the full flow contact at the outer radius of the segments, thereby preserving the fluid layer control for deflector cooling. The embodiment as described in FIG. 2 is highly advantageous from a weight standpoint in that it eliminates any transitional sections or members between the engine and the deflector system, by interconnecting the actuator means for the deflector lip and the variable area nozzle flaps automatic suppression control is achieved in a safe and efficient way, and the construction provides for transient deflection and cooling problems.

Referring now to FIG. 3, substantially the same construction as in FIG. 1 is illustrated. For simplicity and consistency, the reference characters employed in FIG. 1 will be employed in FIG. 3. As shown in FIG. 3, an axially translatable cylindrically shaped member 70 is interposed between the exit of primary exhaust nozzle 4 and the inlet of deflection system 3. As has been amply described in U.S. application No. 714,865 entitled Flow Separation Control in an Exhaust Deflector by S. J. Markowski, it is imperative to maintain full flow at the entrance or inlet of the deflection system when in the VTOL or deflected mode, particularly when deflecting with an afterburning exhaust. As described therein, flow separation leads to high metal temperatures on the deflector segments with resultant failure of the segments.

Since in the embodiment herein described and in general in engine construction utilizing a variable area primary nozzle and blow-in-doors, and deflection system, there results a substantial gap between the ends of the primary nozzle flaps 17 and the inlet of the exhaust deflection system 3. By utilizing the axially translatable member 70, which is actuated axially by actuator 20 when the deflected mode, the large gap between the flaps 17 and inlet of deflection system 3 is eliminated. In fact, member 70 effectively forms an extension of the flaps 17 when member 70 is moved axially upstream. By so moving member 70 upstream, full flow at the inlet of deflection system 3 is insured. An additional effect of moving the member 70 axially upstream is to cause the trailing edge 72 to likewise move upstream and hence towards primary exhaust nozzle 4. The effect of this is to improve deflector efficiency by reducing the magnitude of the side components that are generated as the flow expands from the circular end (not shown) of the circular inner contour of the ejector nozzle to atmosphere along the extremities of the flat deflector lip 22. This significantly reduces the magnitude of side components.

It is to be understood that the invention is not limited to the specific embodiments herein illustrated and described but may be used in other ways without departure from its spirit as defined by the following claims.

I claim:

1. A deflection device for a gas stream from a gas turbine engine having an engine housing, a primary exhaust nozzle for the engine exhaust stream including means for varying the area of the exhaust nozzle from an open position to a closed position with respect to the engine axis, and a deflection system positioned downstream thereof and including a plurality of deflector segments, the segments being movable between a stored position and a deflecting position and defining a flow path with a discharge to ambient, wherein the improvement comprises:

a deflector lip positioned upstream of the primary exhaust nozzle, means for mounting the deflector lip in the segments, means for rotating the deflector lip, the deflector lip being angularly rotatable between a position out of the exhaust stream and into the exhaust stream, the discharge edge of the deflector lip having an angular relationship with the engine axis where the deflector lip is in the erected position, this angular position of the discharge edge defining the area of discharge of the deflection system; and means for moving the deflector lip in and out of the engine exhaust stream.

2. A construction as in claim 1 wherein:

the engine includes an afterburner positioned upstream of the primary nozzle and the afterburner includes a liner positioned concentrically within the engine housing; and the deflector lip comprises a movable substantially flat and rectangular in cross section member, pivotally connected at the downstream side of the afterburner liner at the inner radius of the deflection system.

3. A construction as in claim 1 wherein:

the deflector lip is movable over a range of from zero degrees to ninety degrees into the exhaust stream, the deflector lip when in the zero degree position substantially forming an extension of the afterburner liner.

4. A construction as in claim 1 wherein:

the means for varying the primary exhaust nozzle are interconnected with the means for moving the deflector lip thereby providing automatic engine suppression control.

5. A deflection device for a gas stream from a gas turbine engine having an engine housing, a primary exhaust nozzle for the engine exhaust stream including means for varying the area of the exhaust nozzle from an open position to a closed position with respect to the engine axis, and a deflection system positioned downstream thereof and including a plurality of deflector segments, the segments being movable between a stowed position and a deflecting position and defining a flow path with a discharge to ambient, wherein the improvement comprises:

a deflector lip positioned within the deflection system and hence being downstream of the primary exhaust nozzle, means for mounting the deflector lip therein, the deflector lip being substantially flat and rectangular in cross section, means for rotating the deflector lip, the deflector lip being angularly movable with respect to the center line of the engine, the angular position of the discharge edge defining the area of discharge of the deflection system.

6. A construction as in claim 5 wherein:

the deflector lip is movable over a range of from zero degrees to ninety degrees, the deflector lip when in the zero degree position being substantially parallel to the engine axis and substantially forming an extension of the engine housing.

7. A construction as in claim 5 wherein:

the deflection system consists of two deflector segments and the deflected lip is movable not more than fortyfive degrees in an upstream direction from a position which is substantially parallel to the engine axis, this latter position corresponding to the zero degree position.

8. A deflection device for a gas stream from a gas turbine engine having an engine housing, a primary exhaust nozzle for the engine exhaust stream including means for varying the area of the exhaust nozzle from an open position to a closed position with respect to the engine axis, and a deflection system positioned downstream thereof and including a plurality of deflector segments, the segments being movable between a stowed position and a deflecting position and defining a flow path with a discharge to ambient, wherein the improvement comprises:
   a plurality of sealably overlapping blow-in-doors positioned circumferentially around the engine axis, the blow-in-doors being hingeably connected to the engine housing and being positioned upstream of the deflection system;
   a deflector lip positioned within the deflection system, the deflector lip being movable upstream and downstream into and out of the exhaust stream, the discharge edge of the deflector lip therefore being angularly movable with respect to the engine axis, the angular position of the discharge edge defining the area of the discharge system; and
   a translatable liner positioned at the inlet of the deflection system, the liner being movable axially upstream and downstream, the liner substantially forming an extension of the primary exhaust nozzle when the exhaust nozzle is in the open position, the liner thereby insuring full flow at the inlet of the deflection system; and
   means for translating the liner upstream and downstream.

9. A construction as in claim 8 wherein:
   the translatable liner is substantially circular and concentric with the engine axis.

10. A construction as in claim 8 wherein:
   the means for translating the liner and the means for moving the primary nozzle from a closed position to an open position are interconnected such that the liner is translated upstream when the primary exhaust nozzle is in its open position.

References Cited

UNITED STATES PATENTS 3,057,150  10/1962  Horgan _____ 239—265.27
3,380,660  4/1968  Markowski _____ 239—265.27

LLOYD L. KING, Primary Examiner